United States Patent [19]

Massey et al.

[11] Patent Number: 5,013,160
[45] Date of Patent: May 7, 1991

[54] COMBINED ELECTRONIC CLINICAL THERMOMETER AND PACIFIER

[76] Inventors: Darryl D. Massey, 1148 10th St., Manhatten Beach; Michael D. Gordon, 4707 La Villa Marina, Apt. A, Marina Del Rey, both of Calif.

[21] Appl. No.: 442,845

[22] Filed: Jan. 4, 1990

[51] Int. Cl.⁵ .................... G01K 7/14; G01K 13/00
[52] U.S. Cl. ................... 374/151; 374/163
[58] Field of Search ......................... 374/151

[56] References Cited

U.S. PATENT DOCUMENTS 3,875,799 4/1975 Webster ............................ 374/163

FOREIGN PATENT DOCUMENTS 56-039434 4/1981 Japan .................. 374/151

OTHER PUBLICATIONS

"Radio Thermometer Fits in Penguin Egg" Electronics, Jan. 3, 1958, p. 86, 455/100.

Primary Examiner—Daniel M. Yasich
Attorney, Agent, or Firm—W. Edward Johansen

[57] ABSTRACT

An integral mouth-piece has a flexible nipple portion and a stop ring flange portion and is used in a combined electronic clinical thermometer and pacifier which easily and safely takes the temperature of either an infant or a small child. The combined electronic clinical thermometer and pacifier includes a housing, a temperature sensitive element, a circuit board, a temperature oscillating circuit, a body temperature measuring circuit and a digital display device. The housing has a front face and is mechanically coupled to the stop ring flange portion. The temperature sensitive element has a transducer and a pair of wire leads. The transducer is disposed in the flexible nipple portion of the integral mouth-piece. When the flexible nipple portion is inserted into the mouth the transducer detects a body temperature. The circuit board is disposed within the housing. The temperature oscillating circuit is electrically coupled to the pair of wire leads of the temperature sensitive element and is disposed on the circuit board. The body temperature measuring circuit is electrically coupled to the temperature oscillating circuit and is disposed on the circuit board. The digital display device is electrically coupled to the body temperature measuring circuit and is disposed on the circuit board. The flexible nipple portion of the integral mouth-piece has an outer sidewall and an inner sidewall with a recessed area in order to allow the transducer, which is disposed adjacent to said recessed area, to be as close to the outer sidewall as possible.

1 Claim, 2 Drawing Sheets

COMBINED ELECTRONIC CLINICAL THERMOMETER AND PACIFIER

BACKGROUND OF THE INVENTION

1. Field of the Inventions

The present invention relates to a combined clinical thermometer and pacifier and more particularly to a combined electronic clinical thermometer and pacifier for easily and safely taking the oral temperature of a child.

2. Description of the Prior Art

U.S. Pat. No. 4,762,429, entitled Electronic Clinical Thermometer with a Battery Lifetime Warning Display, issued to Toyobaru Fujikawa on Aug. 9, 1988, teaches an electronic clinical thermometer which includes a mouth-piece and a housing which is attached to the mouth-piece. The electronic clinical thermometer also includes a temperature oscillating circuit with a temperature sensitive element, a body temperature measuring circuit and a digital display device. The temperature sensitive element detects the body temperature. The body temperature measuring circuit make data on the body temperature in response to an output signal from the temperature oscillating circuit. The digital display device has a seven segment digital patterns and displays the body temperature in response to a signal of the body temperature measuring circuit. The temperature sensitive element has a metallic element and a pair of wire leads and effectively transforms a temperature inside the mouth to an analog signal correlating to the temperature. The temperature oscillating circuit is electrically coupled to the pair of wire leads of the temperature sensing element and is disposed within the housing.

U.S. Pat. No. 4,813,790, entitled Mouth Grips for Oral Thermometers, issued to Steven T. Frankel and Calvin W. Wingo on Mar. 21, 1989, teaches an electronic thermometer which includes a mouth-piece, a housing which is attached to the mouth-piece, a temperature sensitive element, an electrical circuit and a temperature display. The electronic clinical thermometer orally measures the temperature of a living being. The mouth-piece is for insertion into the mouth of the living being. The temperature display displays a digital signal in a digital read-out format and is disposed on the mouth-piece.

U.S. Pat. No. 4,072,054, entitled Combined Pacifying Nipple and Mouth Thermometer Device, issued to Michel Blouin and Leo Mercier on Feb. 7, 1978, teaches a combined pacifying device and mouth thermometer which includes a liquid mercury thermometer tube, a flexible nipple mouth-piece and a stop ring.

U.S. Pat. No. 3,968,690, entitled Combined Infant Pacifier and Thermometer, issued to Michel Blouin and Leo Mercier on July 13, 1976, teaches a combined infant pacifier and mouth thermometer which includes a liquid mercury thermometer tube, a flexible nipple mouth-piece and a stop ring. The mercury liquid thermometer tube has a liquid bulb portion which has an inner open end and an outer closed end, a temperature display portion which is joined to the inner open end of the liquid bulb portion along the mercury liquid thermometer tube. The flexible nipple mouth-piece freely surrounds the outer end of the liquid bulb portion and has apertures therethrough placing the bulb portion in open communication with the exterior of the mouth-piece. The stop ring is secured over the liquid temperature tube at the junction between the bulb portion and the temperature display portion.

U.S. Pat. No. 3,117,450, entitled Thermometer Pacifier, issued to Thomas E. Hoy on Jan. 14, 1964, teaches thermometer pacifier which includes a pacifier and a mercury thermometer which is associated with the pacifier so that the temperature of a small child may be taken without difficulty. The pacifier includes a framing tube and a hollow bulbous portion in the shape of a nursing nipple with an aperture at its outer end and an enlarged flange at its base end.

U.S. Pat. No. D-268,651, entitled Infant Thermometer, issued to Barbara Doyle on Apr. 19, 1983, teaches an ornamental design for an infant thermometer.

U.S. Pat. No. 3,913,402, entitled Thermometer Pacifier, issued to Barbara Doyle on Oct. 21, 1975, teaches a thermometer in combination with a pacifier for use in ascertaining the temperature of a child. The pacifier includes a rubber nipple and a circular stop flange which are made of one piece and of a flexible material such as a high grade gum rubber. The rubber nipple is of the size and shape usually associated with a child's pacifier and surrounds the well of the thermometer. The pacifier also includes a transparent rigid tubular member which encloses the glass stem of the thermometer so that a child cannot break the glass stem of the thermometer. The transparent rigid tubular member is inserted into the rubber nipple and the circular stop flange and may be removed so that the rubber nipple and the circular stop flange may be sterilized.

U.S. Pat. No. 4,619,271, entitled Electronic Thermometer with Probe Isolation Chamber, issued to Laurie J. Burger, Joel N. Helfer, Donald E. Protzmann and Robert F. Uhl on Oct. 28, 1986, teaches an electronic thermometer which includes a color coded probe permanently fastened by an electrical cable to a color coded isolation chamber in order to prevent inadvertent use of a rectal probe with a red isolation chamber. Red and blue isolation chambers are used for oral and rectal temperature, respectively and can be readily used with one thermometer housing.

SUMMARY OF THE INVENTION

In view of the foregoing factors and conditions which are characteristic of the prior art it is the primary object of the present invention to provide an electronic clinical thermometer which is combined with a pacifier for easily and safely taking the oral temperature of either an infant or small child.

In accordance with an embodiment of the present invention an integral mouth-piece has a flexible nipple portion and a stop ring flange portion is described. The integral mouth-piece is used in a combined electronic clinical thermometer and pacifier which easily and safely takes the temperature of either an infant or a small child. The combined electronic clinical thermometer and pacifier includes a housing, a temperature sensitive element, a circuit board, a temperature oscillating circuit, a body temperature measuring circuit and a digital display device. The housing has a front face and is mechanically coupled to the stop ring flange portion. The temperature sensitive element has a transducer and a pair of wire leads. The transducer is disposed in the flexible nipple portion of the integral mouth-piece. When the flexible nipple portion is inserted into the mouth the transducer detects a body temperature. The circuit board is disposed within the housing. The temperature oscillating circuit is electrically coupled to the pair of wire leads of the temperature sensitive element and is disposed on the circuit board. The body temperature measuring circuit is electrically coupled to the temperature oscillating circuit and is disposed on the circuit board. The digital display device is electrically coupled to the body temperature measuring circuit and is disposed on the circuit board. The flexible nipple portion of the integral mouth-piece has an outer sidewall and an inner sidewall with a recessed area in order to allow the transducer, which is disposed adjacent to said recessed area, to be as close to the outer sidewall as possible.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
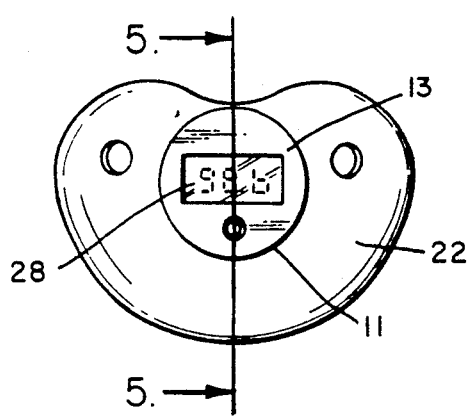
FIG. 1 is a front elevational view of a combined electronic clinical thermometer and pacifier which includes a housing with a front face and a digital display device which is disposed on the front face of the housing and which has been made in accordance with the principles of the present invention.
Figure 2:
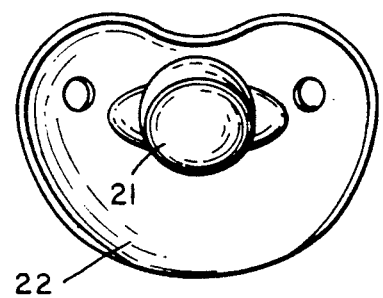
FIG. 2 is a rear elevational view of the combined electronic clinical thermometer and pacifier of FIG. 1 which includes an integral mouth-piece having a flexible nipple portion and a stop ring flange portion which is mechanically coupled to the housing.
Figure 3:
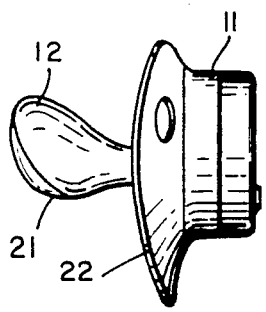
FIG. 3 is a side elevational view of the combined electronic clinical thermometer and pacifier of FIG. 1.
Figure 4:
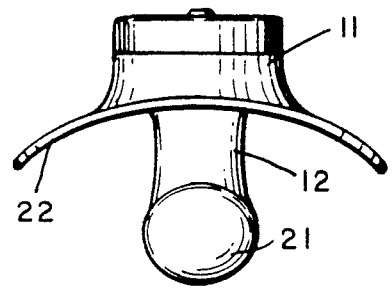
FIG. 4 is a bottom plan view of the combined electronic clinical thermometer and pacifier of FIG. 1.

In order to best understand the present invention it is necessary to refer to the following description of its preferred embodiment in conjunction with the accompanying drawing. Referring to FIG. 1 in conjunction with FIG. 2, FIG. 3 and FIG. 4 a combined electronic clinical thermometer and pacifier 10 for easily and safely taking the temperature of either an infant or small child includes a housing 11 and an integral mouth-piece 12. The housing 11 has a front face 13. The integral mouth-piece 12 has a flexible nipple portion 21 and a stop ring flange portion 22 which is mechanically coupled to the housing 11.

Figure 5:
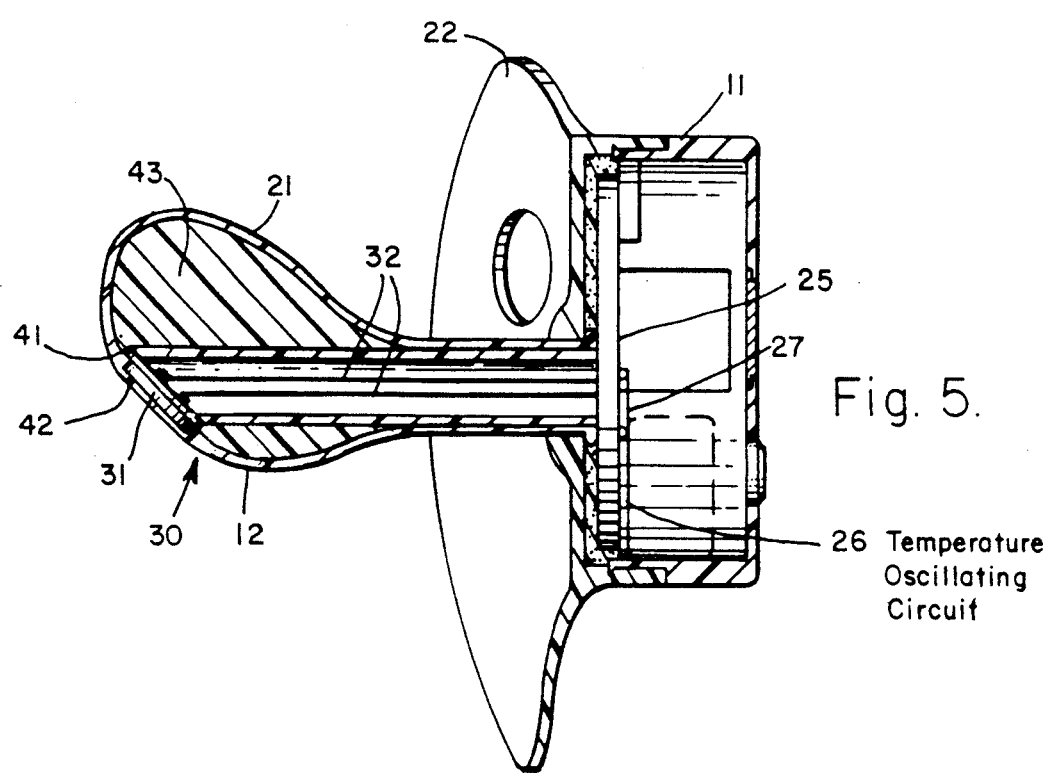
FIG. 5 is a cross-sectional view of the combined electronic clinical thermometer and pacifier of FIG. 1 taken along line 5—5 of FIG. 1.
Figure 6:
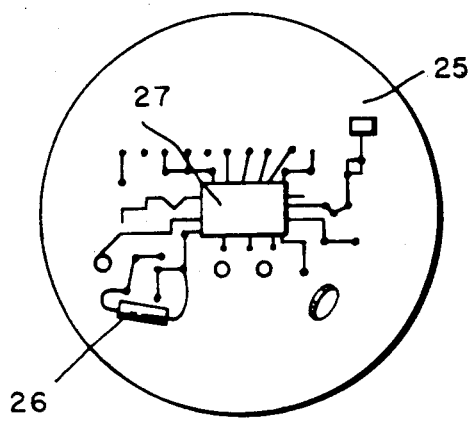
FIG. 6 is a top plan view of a circuit board which includes a temperature oscillating circuit and a body temperature measuring circuit and which is disposed in the housing of the combined electronic clinical thermometer and pacifier of FIG. 1.
Figure 7:
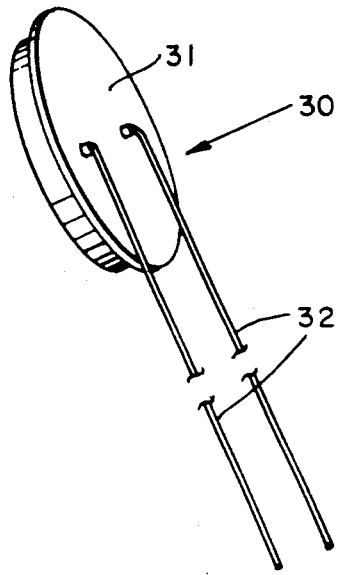
FIG. 7 is a perspective view of a temperature sensitive element which includes a metallic element and a pair of wire leads which are electrically coupled to the temperature oscillating circuit and which is disposed in the flexible nipple of the integral mouth-piece of the combined electronic clinical thermometer and pacifier of FIG. 1.
Figure 8:
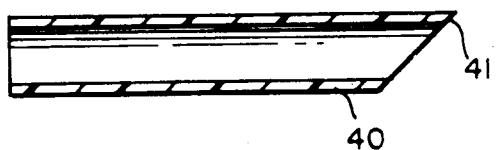
FIG. 8 is a longitudinal view in cross-section of a tubular member.
Figure 9:
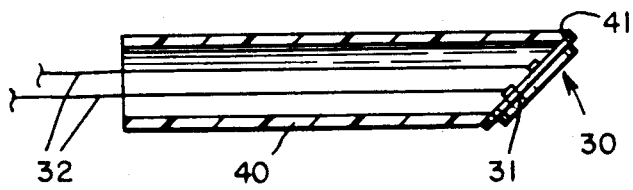
FIG. 9 is a longitudinal view in cross-section of the tubular member of FIG. 8 into which the pair of wire leads of the temperature sensitive element of FIG. 7 are inserted.
Figure 10:
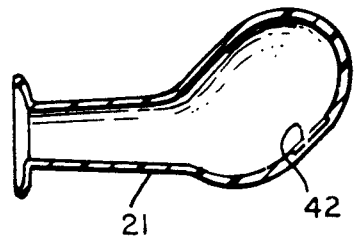
FIG. 10 is a longitudinal view in of the integral mouth-piece of the combined electronic clinical thermometer and pacifier of FIG. 1.
Figure 11:
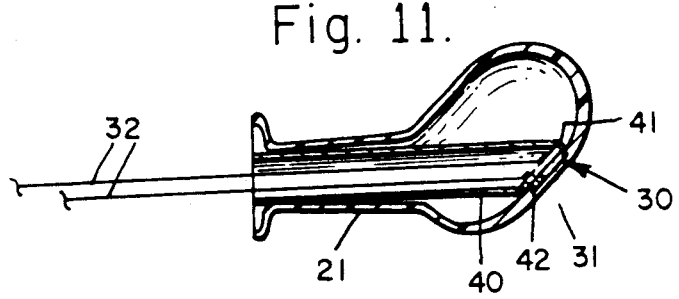
FIG. 11 is a longitudinal view in cross-section of the tubular member of FIG. 8 in which the pair of wire leads of the temperature sensitive element of FIG. 7 are inserted and the integral mouth-piece of the combined electronic clinical thermometer and pacifier of FIG. 1 in which the tubular member of FIG. 8 is inserted.

Referring to FIG. 5 in conjunction with FIG. 6 and FIG. 7 the combined electronic clinical thermometer and pacifier 10 also includes a circuit board 25, a temperature oscillating circuit 26, a body temperature measuring coprocessor 27, a digital display device 28 and a temperature sensitive element 30. The circuit board 25 is disposed within the housing 11. The temperature sensitive element 30 has a transducer 31 and a pair of wire leads 32. The temperature sensitive element 30 is disposed in the flexible nipple portion 21 of the mouth-piece 12. When the flexible nipple portion 21 is inserted into the mouth the transducer 31 detects a body temperature. The temperature oscillating circuit 26 is electrically coupled to the pair of wires 32 of the temperature sensitive element 30 and is disposed on the circuit board 25. The body temperature measuring co-processor 27 is electrically coupled to the temperature oscillating circuit 26 and is disposed on the circuit board 25. The digital display device 28 is electrically coupled to the body temperature measuring coprocessor 27 and is disposed on the circuit board 25.

Referring to FIG. 5 in conjunction with FIG. 8, FIG. 9, FIG. 10 and FIG. 11 the combined electronic clinical thermometer and pacifier 10 may also include a tubular member 40 with a truncated end 41. The pair of wire leads 32 of the temperature sensitive element 30 are inserted into the tubular member 40 so that the transducer 31 is contiguous to its truncated end 41. The tubular member 41 is inserted into the flexible nipple portion 21 of the integral mouth-piece 12 of the combined electronic clinical thermometer and pacifier 10 so that the transducer 31 contacts the inner sidewall of the flexible nipple portion 21 at a recessed area 42 in order to allow the metallic tip to be as close to the outer sidewall of the flexible nipple portion 21 as possible. The flexible nipple portion 21 of the integral mouth-piece 12 may be filled with silicone 43 which would surround the tubular member 40 in order to provide resistance to the child's chewing on the flexible nipple portion 21 of the integral mouth-piece.

From the foregoing it can be seen that a combined electronic clinical thermometer and pacifier for easily and safely taking the oral temperature of a child has been described. It should be noted that the sketches are not drawn to scale and that distance of and between the figures are not to be considered significant.

What is claimed is:

1. An integral mouth-piece having a flexible nipple portion and a stop ring flange portion for use in a combined electronic clinical thermometer and pacifier for use in easily and safely taking the temperature of either an infant or a small chile, the combined electronic clinical thermometer and pacifier including:

a. a housing which has a front face and which is mechanically coupled to the stop ring flange portion;
b. a temperature sensitive element having a transducer and a pair of wire leads, the transducer of the temperature sensitive element being disposed in the flexible nipple portion of the integral mouth-piece whereby when the flexible nipple portion is inserted into the mouth the transducer detects a body temperature;
c. a circuit board which is disposed within the housing;
d. a temperature oscillating circuit which is electrically coupled to the pair of wire leads of the temperature sensitive element and which is disposed on the circuit board;
e. a body temperature measuring circuit which is electrically coupled to the temperature oscillating circuit and which is disposed on the circuit board; and
f. a digital display device which is electrically coupled to the body temperature measuring circuit and which is disposed on the circuit board, said flexible nipple portion of said integral mouth-piece comprising an outer sidewall and an inner sidewall with a recessed area in order to allow the transducer, which is disposed adjacent to said recessed area, to be as close to said outer sidewall as possible.

* * * * *